United States Patent [19]

Mayer

[11] Patent Number: 4,615,172
[45] Date of Patent: Oct. 7, 1986

[54] PROCESS FOR REGENERATING THE EXHAUST-GAS PARTICLE FILTER OF INTERNAL-COMBUSTION ENGINES

[75] Inventor: Andreas Mayer, Niederrohrdorf, Switzerland

[73] Assignee: BBC Brown, Boveri & Company, Limited, Baden, Switzerland

[21] Appl. No.: 702,745

[22] Filed: Feb. 19, 1985

[30] Foreign Application Priority Data

Feb. 21, 1984 [CH] Switzerland ............... 823/84

[51] Int. Cl.⁴ .................. F01N 3/02; F02B 37/00; F02B 33/42
[52] U.S. Cl. .......................... 60/274; 60/602; 123/559
[58] Field of Search ............ 60/274, 286, 311, 600, 60/601, 602, 603; 123/559

[56] References Cited

U.S. PATENT DOCUMENTS 4,517,950  5/1985  Mayer .................... 123/559

FOREIGN PATENT DOCUMENTS 72059    2/1983  European Pat. Off. ........ 123/559
8101171  4/1981  PCT Int'l Appl. ........... 60/602

Primary Examiner—Douglas Hart
Attorney, Agent, or Firm—Burns, Doane, Swecker & Mathis

[57] ABSTRACT

A process for continuous regeneration of an exhaust-gas filter of an internal combustion engine having a supercharger unit is described. Operating parameters of the engine are compared to pre-set values in a control device to adjust the position of a throttle flap valve preceding the supercharger unit in order to maintain a high temperature on the exhaust-gas filter.

1 Claim, 2 Drawing Figures

PROCESS FOR REGENERATING THE EXHAUST-GAS PARTICLE FILTER OF INTERNAL-COMBUSTION ENGINES

BACKGROUND OF THE INVENTION

The invention relates to a process for regenerating the exhaust-gas particle filter of an internal combustion engine with a supercharger unit having a preceding flap valve.

There are already statutory limits in some countries of the degree of particle emission from internal-combustion engines; other countries will follow suit, and it may generally be expected that the permissible limiting values of exhaust-gas particles will be made more stringent.

The particle emission from internal-combustion engines is composed essentially of the following constituents:
freely suspended soot,
hydrocarbon compounds and other organic substances added to the soot,
sulphate compounds,
lead compounds, particularly in spark-ignition engines.

It has not yet been possible hitherto to eliminate particle emission in internal-combustion engines completely by means of measures carried out within the combustion process, but progress has already been made in reducing particle emission as a result of precautions applied to the exhaust gases.

It is known from EP-A-No. 72,059 to arrange an exhaust-gas particle filter in the high-pressure part of the exhaust system in front of the pressure-wave machine. When clogging of the exhaust-gas particle filter occurs under partial load, the primary effect is that its pressure loss impedes the gas exchange of the engine, thus resulting in a reduction in useful power. The vehicle driver compensates for the power loss by supplying a greater quantity of fuel. If the vehicle driver demands sufficiently high power from the vehicle, the exhaust-gas temperature increases sharply and the exhaust-gas particles deposited in the filter burn off automatically. The temperature surge on which this control operation is based can also be achieved when the supercharging-air flap, exhaust-gas bypass valve or recirculation flap are briefly actuated. When the supercharging-air flap or recirculation flap is closed or the exhaust-gas bypass valve is opened, the supercharging-air density and consequently the excess air is briefly reduced, and with a constant fuel supply quantity this increases the exhaust-gas temperature.

However, this sporadic regeneration of the exhaust-gas particle filter necessarily results in continuously increasing clogging of the filter and therefore in a poor thermodynamic behaviour of the engine. Sporadic regeneration of the exhaust-gas particle filter means per se a random uncontrolled burn-off of the deposits and, because of the high temperature gradients and thermal stresses, leads to fatigue of the material and destruction of the filter. It must also be assumed that the resistance and high thermal inertia of the exhaust-gas particle filter worsen the fuel consumption and the driving performance, above all under transient conditions.

OBJECTS AND SUMMARY OF THE INVENTION

The invention is intended to remedy this. The invention, is based on the object of making the regeneration of the exhaust-gas particle filter continuous rather than sporadic.

The advantage of the invention is essentially in that, as a result of the constant burn-off of the filtered exhaust-gas particles, not only the soot discharge, but also HC emission is minimized, and at the same time, the formation of $NO_X$ is reduced because exhaust-gas recirculation is employed as a means of increasing the probability of regeneration. Furthermore, the constant burn-off guarantees a uniform operating behaviour of the filter, the resistance of which remains low and constant, with the result that the driving performance (response behaviour) of the vehicle is not impaired in any way.

For this purpose, the exhaust-gas temperature must be increased over the entire part-load range: combustion of the filtered exhaust-gas particles starts at a temperature of 500° to 550° C., provided that an oxygen concentration of 3% to 6% is available.

The exhaust-gas particle filter is a heat sink which impairs the response behaviour of the supercharger unit which follows it. As a result of the increase in the exhaust-gas temperature over the part-load range, the exhaust-gas particle filter is heated until only a little heat is still being extracted from the exhaust gas at the time of transition to full load. At the same time, the recirculated quantity of exhaust gas must be so great and be so distributed over the performance characteristics that in the certification cycle the statutory limits with regard to $NO_X$ emission are observed. As a result of this measure, on the one hand the fuel consumption of the engine should not increase, and on the other hand the particle production rate should not rise substantially above the average value. The control concept for the control elements, namely the supercharger unit, throttle flap, exhaust-gas particle filter, supercharging-air cooling, etc., is based on a linked sequence of control and regulating operations.

When rapid changes in engine load or engine speed occur, the throttle flap passes quickly into the neutral (open) position or remains there under control. When the rapid change of position is completed, the throttle flap is moved under control into the angular position stored for the performance characteristics as a whole, this being carried out as a function of the engine speed and load. This means that the throttle flap is regulated only from its controlled position, the parameters to be regulated by the elements connected synchronously with one another being, for example, the supercharging-air temperature, exhaust-gas temperature and/or oxygen concentration of the exhaust gas.

BRIEF DESCRIPTION OF THE DRAWINGS

Certain preferred embodiments of the invention are illustrated diagrammatically in the drawing in which.

DETAILED DESCRIPTION

All elements not necessary for an immediate understanding of the invention are omitted. The flow direction of the working region is indicated by arrows. In the Figures, identical elements bear the same reference symbols.

Figure 1:
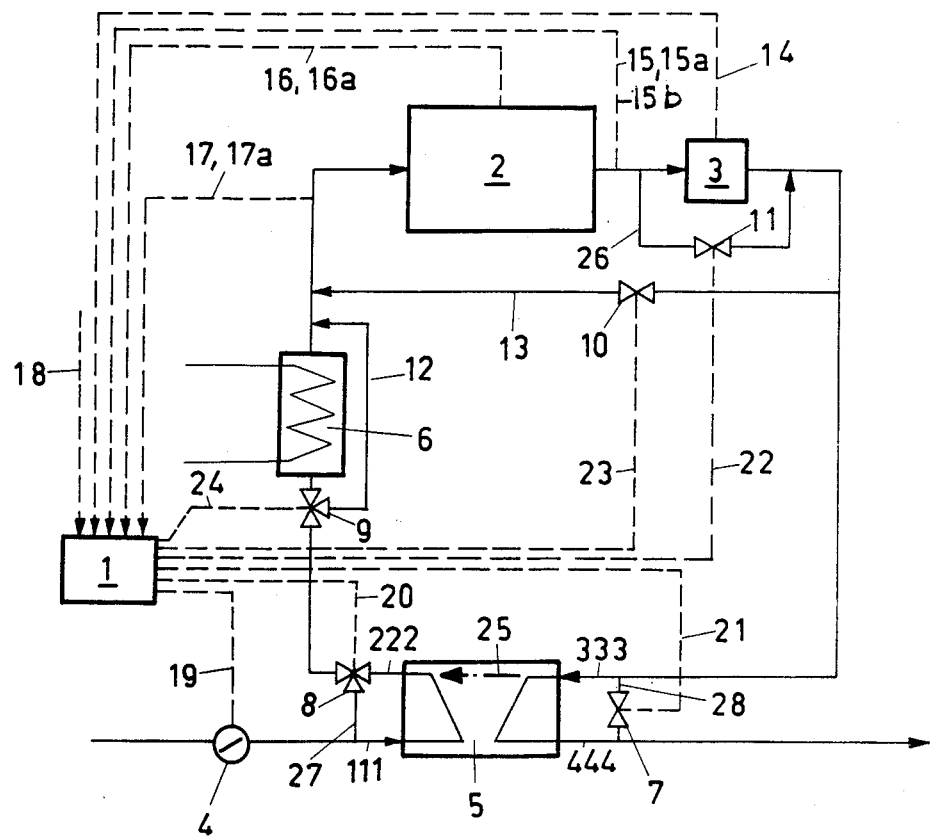
FIG. 1 shows a control circuit of an engine with a pressure-wave supercharger.

FIG. 1 illustrates a control circuit with a pressure-wave supercharger 5. The control unit 1 constantly receives the following input signals:

engine speed 16 and engine torque 16a supercharging pressure 17 and supercharging-air temperature 17a exhaust-gas pressure 15 and exhaust-gas temperature 15a in front of the exhaust-gas particle filter 3 oxygen concentration 15b in the exhaust gas pressure drop 14 across the exhaust-gas particle filter 3 periodic time signal 18.

Fixed-programmed parameters are entered in the control unit 1:

a two-dimensional family of characteristics relating to the throttle-flap angle and defining the smallest possible closing angle of the throttle flap as a function of the engine speed 16 and the engine torque 16a the desired value for the supercharging-air temperature 17a for regulation purposes, a throttle-flap angle pulsation law a preset acceleration limit the operational range in the family of characteristics (lower/upper engine speed 16 and lower/upper engine torque 16a), in which control or regulation will start, the throttle flap 4 automatically being in the neutral position outside this operational range.

The control unit 1 uses the input signals to make comparisons with the preset values and derives from them logical decisions which result in an instruction 19 to the actuator of the throttle flap 4.

The operating cycle of the process is considered, in a first description, without supercharging-air cooling 6 and without exhaust-gas return 13.

The functioning of the automatic starting valve 8 influences the process in the lowest characteristic range of the engine 1, in particular when the supercharging pressure 17 falls below the response threshold of the starting valve 8. Fresh air 27 from the low-pressure intake 111 is then admixed with the supercharging air 222, or fresh air 27 only is supplied. This mixing region is not discussed separately, but by actuating the control signal 20 it is possible to prevent this influence from being exerted. The inclusion of the waste gate 7 in the control signal 21 allows greater logical flexibility as a function of the engine speed 16, medium pressure and supercharging pressure 17.

As a result of simultaneous logic control of the starting valve 8 and waste gate 7, the pressure-wave supercharger 5 can be bypassed on the air and gas sides at the same time, so that emergency running of the engine 2 is possible in the event of a possible failure of the supercharger 5.

When, during its operation, the engine 2 enters the operational range above the load limit or above the speed limit, whether from above or below, the control unit 1 immediately sends a signal or instruction 19 to cause the throttle flap 4 to close to the appropriate interpolated value by means of comparison to the stored flap-angle characteristics.

This operation is a pure control operation and takes place as quickly as the information can be processed and as quickly as a servo-motor (not shown) can move the throttle flap 4, typically within 0.1 to 1 second. The throttle flap 4 in the pressure-wave supercharger intake line 111 restricts the degree of scavenging, and in the pressure-wave supercharger 5 recirculation (from 333 to 222) increases and the supercharging pressure decreases. This ensures that the temperature of the supercharging air 222 supplied to the engine 2, including the admixture of inert gas from primary recirculation 25, increases.

The pressure-wave supercharger 5 is adjusted to the new situation with a time delay of 2 to 3 msec. When the hot supercharging air 222 enters the engine 2 after a further 0.1 seconds, the engine process thus takes place with a high initial temperature, reduced excess air and a higher proportion of inert gas. As a result of this, the temperature of the exhaust gases 333 rises, extreme temperature peaks in the flame front being eliminated because of the increased proportion of inert gas, thus reducing the $NO_X$.

When the supercharging-air temperature increases by approximately 80° C., the exhaust-gas temperature in front of the exhaust-gas particle filter 3 increases by approximately 150° C. The exhaust-gas particle filter 3 is heated up correspondingly, with an increase in regenerating capacity.

After a certain time has elapsed, corresponding to the time constant of the control circuit including that of the exhaust-gas particle filter 3, typically approximately 10 seconds, the exhaust-gas temperature in front of the pressure-wave supercharger 5 will also increase correspondingly. Consequently, the supercharging pressure rises in turn, while the supercharging-air temperature now reaches values which are above the intended level.

Regulation now starts here. As soon as the preselected desired supercharging-air temperature value is exceeded, the control unit sends a signal 19 to the throttle-flap regulating circuit to move the flap from the preselected position in the "opening" direction. The properties of the controller, that is to say its P-degree and I-degree, can be preset appropriately, even self-adjusting processes being possible in the "computer regulation" of the control unit 1. Control alone would not be possible, since otherwise the limits would be exceeded and it would not be possible to compensate for disturbance variables (increased intake temperature, filter contamination, etc.). However, regulation alone is also not possible, since the large time constant of the control circuit necessarily makes regulation unstable, that is to say the throttle flap 4 would initially close far too much. The system therefore starts from a basic step (characteristic-controlled throttle-flap setting) which is selected so that the temperature rises quickly; in a second step, when the desired value of the process is reached, regulation starts, and this intercepts the process and quickly sets the required value. When the engine 2 moves within the operational range, the flap position always adjusts to satisfy the particular local requirement. When the engine 2 leaves the operational range, the throttle flap 4 has to be brought into the neutral position as quickly as possible (within approximately 0.1 seconds). The control unit 1 transmits this signal 19, and the throttle flap 4 moves into the neutral position at high speed.

When the driver quickly presses on the accelerator pedal, typically in approximately 0.1 seconds, the full speed-dependent fuel quantity is immediately released by the engine; the pressure-wave supercharger 5 therefore has to provide as quickly as possible its maximum quantity of air for this point. If this does not occur, there is a deficiency of air, and combustion takes place more slowly and is finally disrupted.

The transition from the throttled state to the non-throttled state must therefore take place rapidly.

For this purpose, the control unit 1 forms a signal from the change in time of the control path. A limit is preset for this variable. When the limit is exceeded, that is to say in the event of a rapid change in the control path, a switch to high-speed motion is made immediately and the throttle flap 4 moves abruptly into the neutral position. The fact that the supercharging pressure is then also available immediately and primary recirculation 25 is discontinued is because of the natural property of the pressure-wave supercharger 5 which adjusts to this change in the boundary condition in the low-pressure inflow line 111 within a few msec.

When the exhaust-gas particle filter 3 is coated and there is a deficiency of air and the power is high, regeneration does not take place. Since the driver attempts to compensate for power loss by pressing harder on the accelerator, the exhaust-gas particle filter 3 becomes constantly hotter and fuller. When the driver takes his foot off the accelerator, there is suddenly sufficient air and regeneration, the speed of which depends on the coating of the exhaust-gas particle filter 3, the oxygen content and the temperature, starts at a rapid rate, and the exhaust-gas particle filter 3 begins to burn empty. However, the pressure loss is eliminated and the temperatures within the exhaust-gas particle filter 3 can rise so sharply that there is a danger that it will be destroyed. The control unit 1 can detect this situation, because it compares with a limiting value the speed of regeneration detectable as a result of a change in pressure loss and consequently immediately closes the throttle flap 4 into an emergency position, in which there is still less air released than in the originally stored characteristics, in such a way that the oxygen content, received by the control unit from 15b, is thereby reduced to below 2%: burning is extinguished. It can be advantageous to heat the exhaust-gas particle filter 3 at the oxygen limit and then subject it to a high proportion of oxygen. This is particularly advantageous for exhaust-gas particle filters 3 covered with catalytic material. The control unit 1 is in a position to superimpose a pulsating movement on the particular position of the throttle flap 4 in accordance with the periodic time signal 18, the amplitude of pulsation, the retention times in the open and closed positions and the modulation interval being preset in the memory of the control unit 1. In overrunning—downhill driving, foot off the accelerator, injection quantity equals 0—the heat present in the process and stored in the material is gradually dissipated into the exhaust 444 as a result of the constant intake of fresh air 27. The exhaust-gas particle filter 3 is consequently cooled, and a delay in response must be expected initially when the engine is accelerated again.

To eliminate this phenomenon or at least reduce its adverse effects, the control unit 1 will determine when overrunning occurs by means of an interpretation of the fuel quantity. It then brings the throttle flap 4 immediately into a maximum-closed position which is stored independently of the other throttle-flap angles.

At the same time, the starting-valve bypass should be arranged after the throttle flap 4, so that during overrunning no cool fresh air can be sucked in.

The scavenging of the pressure-wave supercharger 5 is now extremely reduced and can be brought down to 0; this occurs when the throttle flap 4 is completely closed. When air no longer enters the pressure wave supercharger 5, it is also impossible for any gas 444 to leave the pressure-wave supercharger, that is to say the engine 2 has 100% recirculation. The circulating gas will lose heat via the line leading into the open, but on the other hand some heat is constantly supplied as a result of the compression work of the engine 2. In sum, it will at least be ensured that the exhaust-gas particle filter 3 will cool more slowly than without this measure.

The control circuit described hitherto can be combined with a secondary exhaust-gas return 13. This gas is at "maximum heat", that is to say a maximum temperature increase is obtained as a result of admixing with the supercharging air 222. The pressure-wave supercharger 5 now becomes non-throttled, that is to say its supercharging pressure and oxygen content remain high. Since the air excess is now greater than in the comparable case, the exhaust-gas temperature will be somewhat lower. Higher recirculation rates and hotter recirculating exhaust gas can partially compensate for the effect. Above all, the higher oxygen content could be advantageous for the particular exhaust-gas particle filter 3 in this process combination. Of course, what has been said also applies to oxidation catalysts.

Since the increase in the supercharging-air temperature as a result of the exhaust-gas return 13 does not affect the pressure-wave supercharger 5, the combined process can provide improvements by increasing the temperature to, for example, 250° C. The control signal 23 of the exhaust-gas return valve 10 must, of course, be synchronised with the control of the throttle flap 4.

The control circuit can also be supplemented by supercharging-air cooling 6 with a bypass line 12. The use of the throttle flap 4 is, of course, intended to increase the supercharging-air temperature in the part-load range. A supercharging-air cooler extracts the heat again from the supercharging air, consequently neutralising the result. However, supercharging-air cooling 6 is aimed at the full-load range, since the air excess will be increased there as a result of an increase in density, and this entails an improvement in the power and fuel consumption of the engine 2. Supercharging-air cooling 6 is not necessary in the part-load range. On the contrary, it even often happens that an increase in the temperature under partial load improves both the fuel consumption (varible-cooling) and the noise level of a Diesel engine.

The problem is solved because the supercharging-air cooling system 6 is bypassed by means of the bypass line 12, and at the same time the valve 9 must be regulated by a signal 24 synchronously with the control of the throttle flap 4: consequently, in the operational range, the supercharging air 222 bypasses the supercharging-air cooling system 6. When the upper limit of the operational range is exceeeded, the bypass 12 is closed and the supercharging air is cooled.

The use of engine cooling water is particularly suitable for supercharging-air cooling 6. It would even be possible to do without the bypass 12 if the combined system with exhaust-gas return 13 is adopted: the supercharging air, without primary recirculation 25, enters the supercharging-air cooling system 6 relatively cold. There, it is heated to approximately 100° C. and subsequently heated further as a result of the admixture of gas from the exhaust-gas return 13. The oxygen content required can be supplied by the pressure-wave supercharger 5. As a result of throttling by means of the throttle flap 4, in combination with the measures mentioned, the excess air is reduced to the necessary amount.

In the event of failure of the supply voltage to the control unit 1, the throttle flap 4 is automatically brought into the neutral position (spring prestress), and the supercharged engine 2 can be operated further, without damage, maintaining a good driving performance and an unchanged fuel consumption. For the acceleration phases or for emergencies, the exhaust-gas particle filter 3 can be bypassed by means of the bypass 26. For this purpose, the bypass valve 11 is actuated from the control unit 1 by means of a regulating signal 22.

Of course, a turbo-supercharger 28 (see FIG. 2) can be used instead of the pressure-wave supercharger 5. The disadvantages of such a control circuit which are to be eliminated are:

the effect of the throttling measure on the high-pressure difference, no spontaneous transition from the throttled state to the non-throttled state, no possibility of combination of throttling and preheating, the proposed object can be achieved only when the exhaust-gas return valve 10 is used in addition to the throttle flap 4.

Figure 2:
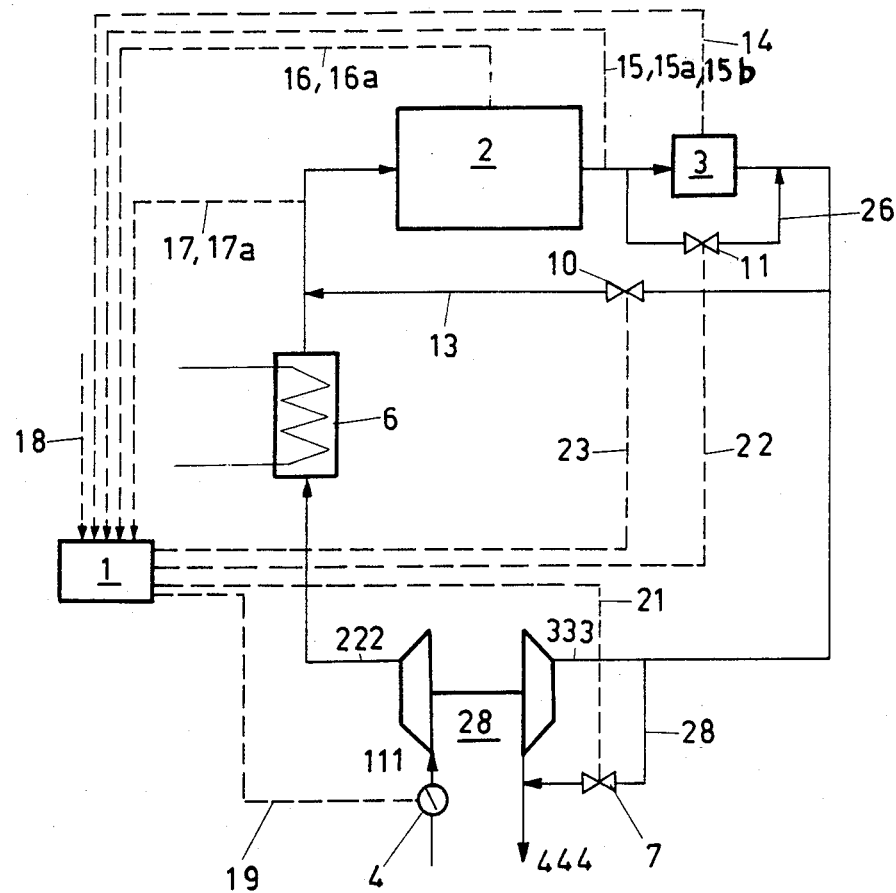
FIG. 2 shows a control circuit of an engine with a turbo-supercharger. .

Otherwise, the example of FIG. 2 is not in any way different from the control circuit of FIG. 1 in terms of the functioning of the elements indicated.

I claim:

1. A process for regenerating an exhaust-gas particle filter of an internal-combustion engine of the type including a supercharging unit with a preceding throttle valve, an exhaust-gas particle filter located on a high-pressure side of the supercharging unit, a starting valve, a waste gate, and an exhaust-gas return valve, comprising the steps of:

comparing the parameters of engine speed, engine torque, supercharging pressure, supercharging temperature, exhaust-gas pressure in front of the exhaust-gas particle filter, oxygen concentration, and pressure drop across the exhaust-gas particle filter to pre-set values of said parameters;

adjusting the throttle valve to a pre-set position to cause a rapid temperature rise in said supercharger unit; and adjusting said throttle valve as a function of said comparing of said parameters to maintain a burn-off temperature on said exhaust-gas particle filter so that regeneration of said exhaust-gas particle filter is continous.

* * * * *